Figure 1:
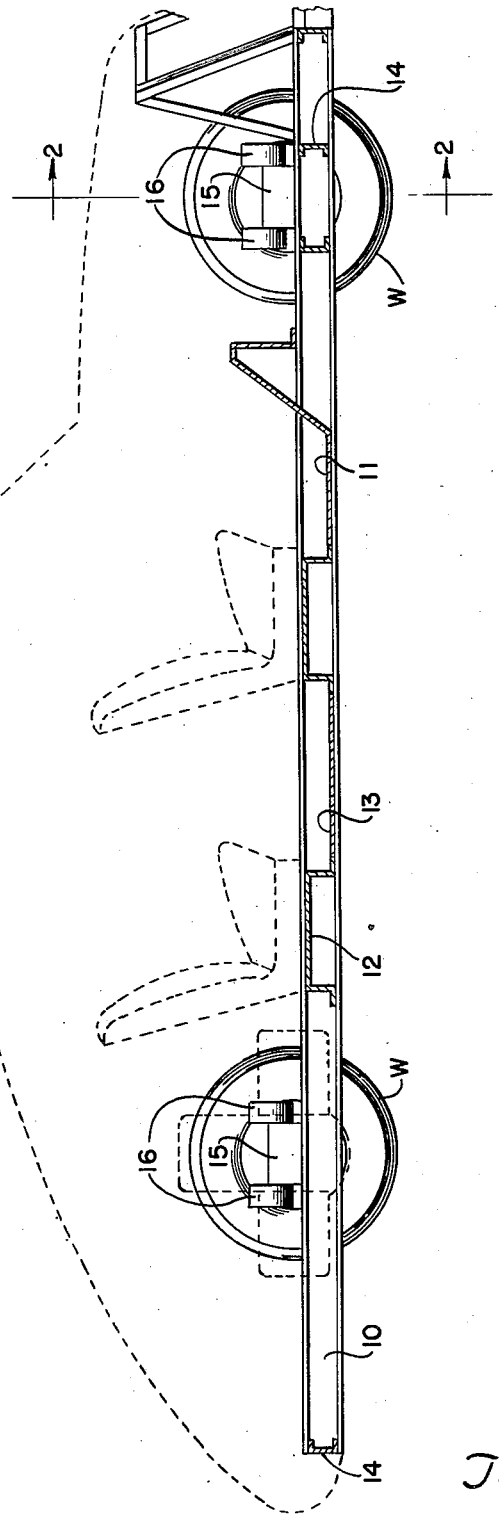

Oct. 16, 1951 K. E. LYMAN 2,571,908
AUTOMOBILE FRAME SUSPENSION
Filed March 24, 1947 2 SHEETS—SHEET 1

INVENTOR
KENNETH E. LYMAN
BY
Toulmin & Toulmin
ATTORNEYS

Oct. 16, 1951  K. E. LYMAN  2,571,908
AUTOMOBILE FRAME SUSPENSION
Filed March 24, 1947  2 SHEETS—SHEET 2
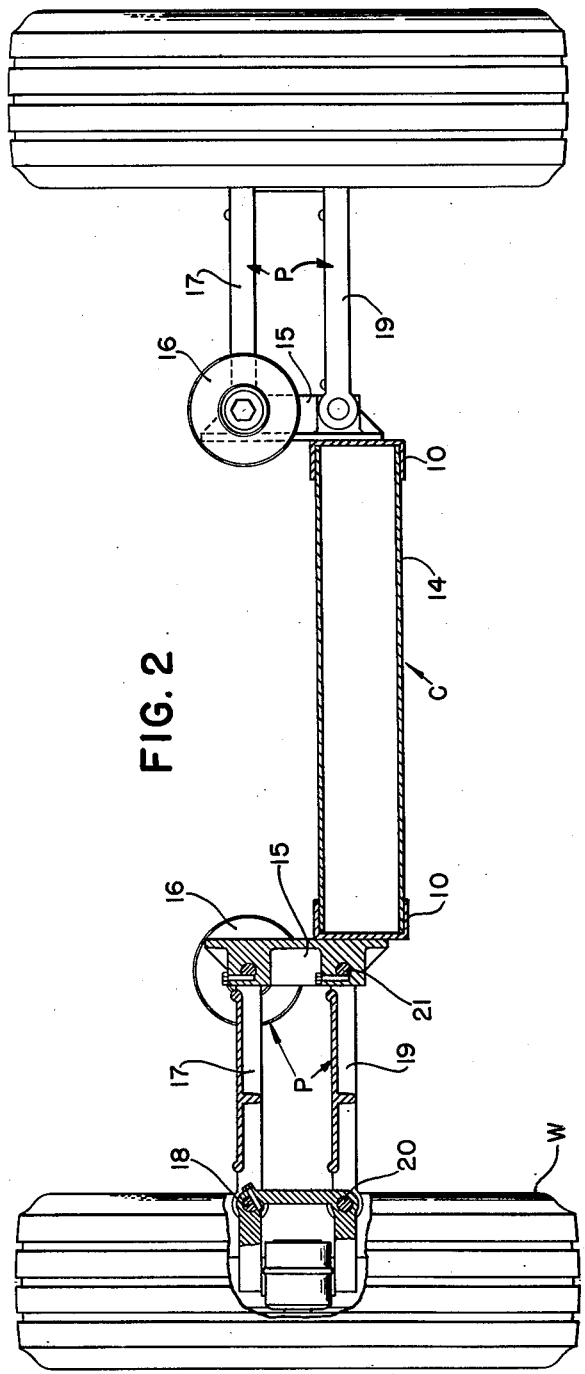
INVENTOR
KENNETH E. LYMAN
BY
Toulmin & Toulmin
ATTORNEYS Patented Oct. 16, 1951

2,571,908

UNITED STATES PATENT OFFICE 2,571,908

AUTOMOBILE FRAME SUSPENSION

Kenneth E. Lyman, Lake Forest, Ill., assignor to The Tucker Corporation, Chicago, Ill., a corporation of Delaware Application March 24, 1947, Serial No. 736,841

2 Claims. (Cl. 267—21)

The present invention deals with automobiles and is concerned primarily with the suspension relation between the vehicle frame or chassis and the wheels.

The invention has in view as its foremost objective the provision of an automobile structure, including a frame or chassis, that is suspended from springs located thereabove, and which springs are in turn individually connected to the wheels.

More in detail, the invention has as an object the provision of an automobile in which the chassis is suspended from torsion springs located thereabove. With this arrangement it is possible to locate the automobile body closer to the ground and achieve greater stability.

A further object is to provide in an automobile of the type indicated, a chassis which is supported in suspended position by four parallelogram supports, each of which is connected at one side to a wheel, and at the other to the chassis. Each of these supports includes a torsion spring positioned above the chassis with an element thereof connected to the chassis, and another element to the parallelogram support.

With the arrangement provided in accordance with the objects of this invention, the chassis is held in a suspended position close to the ground and at the same time adequate provision is made for the spring action which is essential to good riding conditions.

Various other detailed objects and advantages of the invention such as arise in connection with carrying out the above noted thoughts in a practical embodiment will in part become apparent and in part be hereinafter stated as the description of the invention proceeds.

The invention therefore comprises an automobile including a chassis that is supported from springs positioned thereabove, and which includes individual suspension supports for each of the four wheels of the car.

For a full and more complete understanding of the invention reference may be had to the following description and accompanying drawings wherein:

Figure 1 is a vertical longtiudinal section through a chassis that is supported from the springs in accordance with the precepts of this invention, and Figure 2 is a vertical section taken on a plane normal to the showing of Figure 1. This view is taken about on the plane represented by the line 2—2 of Figure 1.

Referring now to the drawings wherein like reference characters denote corresponding parts, the chassis of an automobile is identified in its entirety by the reference character C. The chassis C comprises side channel bars 10, to which are secured the side edges of a floor plate 11. The latter may include raised portions 12 and depressed portions 13 for required rigidity. Cross channel bars such as shown at 14 also are included in the chassis construction.

Each of the four wheels of the car is designated W. Each of these wheels is connected to the chassis C by parallelogram supporting structure referred to in its entirety by the reference character P. So far as this invention is concerned, each of these parallelogram supports P is a substantial duplicate of any other and only one of them is here described for the purpose of this specification.

Upstanding from one of the side bars 10 of the chassis C is a vertical upright 15. A torsion spring is represented at 16. An element of this torsion spring is connected to the upright 15, and the other element to one end of a horizontal arm 17. The other end of the arm 17 is pivotally connected to the wheel W as indicated at 18. The parallelogram is completed by a lower horizontal arm 19, which is pivotally connected to the wheel at 20, and to the upright 15 as shown at 21.

This parallelogram supporting construction is substantially reproduced at each of the four wheels.

It will be noted that this provides for the suspension of the chassis C on a plane appreciably below that of the torsion springs 16. Thus, provision is made for keeping the car body low and close to the ground whereby improved stability is obtained.

While the torsion springs 16 are not shown in detail, springs of this type are well-known and available to the purchasing public as such. Such a spring ordinarily includes a cylindrical rubber block having an axial bore. The two elements of the spring are connected to different parts of the rubber block which resists relative movement therebetween.

While a preferred specific embodiment of the invention is hereinbefore set forth, it is to be clearly understood that the invention is not to be limited to the exact constructions illustrated and described because various modifications of these details may be provided in putting the invention into practice within the purview of the appended claims.

What is claimed is:

1. In an automobile including four wheels and a chassis, means for suspending said chassis from said wheels comprising a parallelogram support between each wheel and said chassis, each parallelogram support including a vertical upright extending upwardly from said chassis and terminating at its lower end above the bottom of the chassis, a torsion spring carried at the end of said upright and having an element operably connected to said upright, a horizontal arm connected to the other element of said torsion spring, said horizontal arm being connected to the respective wheel, and a second horizontal arm disposed below the first horizontal arm and having its ends pivotally connected to said wheel and upright, respectively and lying wholly above the bottom of the chassis.

2. In a chassis suspension for a motor vehicle including a wheel and a chassis having side rails, a parallelogram support comprising upper and lower horizontal arms, one end of each arm being pivotally connected to said wheel, a vertical upright extending upwardly from and secured to said chassis side rail and terminating at its bottom above the bottom of the chassis side rail, and to which the other end of said arms are pivotally connected, said arms lying wholly above the bottom of the chassis, and a torsion spring interposed in the connection between said upper arm and said vertical upright.

KENNETH E. LYMAN.

REFERENCES CITED

The following references are of record in the file of this patent:

UNITED STATES PATENTS

| Number | Name | Date |
|---|---|---|
| 2,137,848 | Macbeth | Nov. 22, 1938 |
| 2,186,065 | Fischer | Jan. 9, 1940 |
| 2,200,798 | Megow | May 14, 1940 |
| 2,202,665 | Metz | May 28, 1940 |
| 2,226,406 | Krotz | Dec. 24, 1940 |
| 2,305,795 | Schieferstein | Dec. 22, 1942 |
| 2,416,388 | Hendrix | Feb. 25, 1947 |

FOREIGN PATENTS

| Number | Country | Date |
|---|---|---|
| 427,907 | Great Britain | May 2, 1935 |